United States Patent [19]

Yamada et al.

[11] Patent Number: 4,873,071

[45] Date of Patent: Oct. 10, 1989

[54] GRAPHITE STRUCTURES AND METHOD FOR PRODUCTION THEREOF

[75] Inventors: Yasuhiro Yamada; Takeshi Imamura, both of Tosu; Hidemasa Honda, Suginami; Masaki Fujii, Chikushino; Masanori Minohata, Sakai, all of Japan

[73] Assignee: Koa Oil Company, Limited Director General, Agency of Industrial Science Technology, Tokyo, Japan

[21] Appl. No.: 187,436

[22] Filed: Apr. 28, 1988

[51] Int. Cl.[4] .............................................. C01B 31/04
[52] U.S. Cl. .................................. 423/448; 423/449; 423/460; 264/29.1
[58] Field of Search ................. 423/448, 449, 460; 264/29.1

[56] References Cited

U.S. PATENT DOCUMENTS

| | | | |
|---|---|---|---|
| B 345,422 | 1/1975 | Klett | 423/448 |
| 3,035,308 | 5/1962 | Ragoss et al. | 423/448 |
| 3,302,999 | 2/1967 | Mitchell | 423/448 |
| 3,749,688 | 7/1973 | Mihelic et al. | 423/448 |
| 3,830,740 | 8/1974 | Amagi et al. | 423/448 |
| 3,917,806 | 11/1975 | Amagi et al. | 264/29.1 |
| 3,922,334 | 11/1975 | Marek et al. | 264/29.1 |
| 4,022,875 | 5/1977 | Vinton et al. | 423/448 |
| 4,205,055 | 5/1980 | Maire et al. | 423/448 |

FOREIGN PATENT DOCUMENTS 61-236605  10/1986  Japan ................................. 423/448

OTHER PUBLICATIONS

Nicholson et al., Syntactic Carbon Foam, Carbon Journel, 1973, vol. 11, No. 1, pp. 65–66.

*Primary Examiner*—Robert L. Stoll
*Assistant Examiner*—Robert M. Kunemund
*Attorney, Agent, or Firm*—Wenderoth, Lind & Ponack

[57] ABSTRACT

A graphite structure, which is of light weight and excellent elasticity and has a packing density of 0.5 g/cm$^3$ or lower and a recovery of 50% or higher at a compressibility of 10 to 90%, is obtained by treating a carbonaceous material with nitric acid or a mixture of nitric and sulfuric acids and, then, heat-treating the obtained product at a temperature of 2,400° C. or higher to graphitize the same.

4 Claims, No Drawings

GRAPHITE STRUCTURES AND METHOD FOR PRODUCTION THEREOF

BACKGROUND OF THE INVENTION

The present invention realtes to graphite materials and, more specifically, to graphite structures of light weight and excellent elasticity and to a method for the production of such structures.

Generally available carbon materials, whether carbonaceous or graphitic, are characterized in that they are rigid structures and possess high Young's modulus. Light-weight carbon materials, on the other hand, include carbon foams, hollow carbon spheres and expandable graphite.

Carbon foams have been prepared either by foaming, curing and calcining polyurethane or phenol resins or by forming and calcining hollow carbon spheres with the aid of a binder (see U.S. Pat. Nos. 3121050, 3342555 and 3302999, and Inada, et al., "Carbon", No. 69, page 36, 1972). Such foams are found to have a bulk density of the order of about 0.5 g/cm$^3$, but their graphitized structures have poor flexibility and are thus rigid.

Hollow carbon spheres have been produced by the melting and atomizing of foam-containing pitches into spherical form, followed by calcination (see Amagi, "Materials", Vol. 16, page 325, 1971). Such spheres are relatively light-weight materials, as expressed in terms of bulk density of 0.1 to 0.3 g/cm$^3$, but are rigid for lack of flexibility.

Expandable graphite has generally been made by the oxidation and heat-treatment of naturally occurring scaly graphite. This graphite is light in weight as expressed in terms of its coefficient of expansion which may reach a factor of several hundreds, but may be subjected to compression molding, as will be appreciated from the fact that it is usable as the starting material for graphite sheets. Graphite sheets obtainable from such an expandable graphite are flexible and possess elasticity to such an extent that they are restorable to their original form after a compression load has been applied thereto and removed therefrom. For that reason, they are said to excel in air-tightness when used as packing material. However, such sheets are of a densified small as about 40% and a recovery of as small as about 20%, when they are subjected to a compression load of 350 kg/cm$^2$ [Saito, "Kogyo Zairyo" ("Industrial Materials"), Vol. 20, page 34, 1985].

On the other hand, mesocarbon microbeads obtained by the separation of minute mesophase-spheres formed at the incipient stage of carbonization of pitches are one form of carbonaceous mesophases. In one method proposed in Japanese Patent Laid-Open Publicaion No. 60(1985)1508319, a microporous carbonaceous material is obtained by nitrating and heat-treating such microbeads. However, this method produces only microporous structures by that heat treatment without giving rise to any substantial icnrease in volume, and is not directed to reductions in weight.

SUMMARY OF THE INVENTION

The present invention has been accomplished in view of the foregoing and has its object to provide graphite structures which are light in weight but have excellent elasticity and a method for production of such a structure.

The present graphite structures of light weight and excellent elasticity are characterized by a packing density of 0.5 g/cm$^3$ or lowe and a recovery of 50% or higher at a compressibility of 10 to 905.

The method for the preparation of graphite structures according to this invention is characterized by the steps of treating a carbonaceous material with nitric acid or a mixture of nitric and sulfuric acids and graphitizing the same at a temperature of 2,400° C. and higher.

DETAILED DESCRIPTION OF THE INVENTION

Carbonaceous Material

The carbonaceous materials used as the starting materials for the graphite structures of this invention are preferably carbonaceous mesophases prepared by heat treatment of pitches that are heavy bituminous materials and/or green coke.

As the starting carbonaceous materials, use may be made of any kind of pitches which produce the graphitizable carbon. Examples are coal tar pitch, coal base pitch such as liquefied coal pitch, naphtha tar pitch produced as a by-product during the thermal cracking of distillate residues of petroleum and naphtha, petrolic pitch such as, for instance, FCC decanted oil produced as a by-product in the fluid catalytic cracking (FCC) process of naphtha, etc. and pitch obtained from the thermal cracking of synethtic high molecules, e.g., PVC, and the like. These pitches are heat-treated at about 350° to 500° C., thereby forming carbonaceous mesophases (including green coke). The formation of carbonaceous mesophases is easily ascertainable by the observation of the heat-treated products under a polarized-light microscope. In other words, the carbonaceous mesophase is identified as optically anisotropic texture in the pitch that is optically isotropic one. In view of the morphology of carbonaceous mesophase, it is required at this time that the heat treatment proceed through its gentle stage, i.e., the early stage of the process of carbonization where single mesophase-spheres are formed to so-called bulk mesophase where such spheres grow and coalesce with each other. The reason is that any substantial increase in volume is not achieved by treating mesocarbon microbeads separated at the stage of single spheres with a mixed sulfuricnitric acid and then heat-treating them, although they are a sort of carbonaceous mesophase.

The heat-treatment conditions for the formation of carbonaceous mesophase are determined depending upon the elemental analysis of carbonaceous mesophase separated from heat-treated pitches. The conditions should preferably be such that, among the elements, hydrogen in particular is prsent in an amount of 2% by weight or more. The reason is that this takes part in the next treatment with a mixed sulfuric-nitric acid, i.e., the amount of the nitro gruop introduced in the aromatic nucleus substitution reaction.

It is, therefore, necessary to avoid excessive heat treatment, since semicoke obtained by solidfying the total amount of pitches under severe heat-treatment conditions has a hydrogen content of at most 2%, so that its volume does not substantially increase even upon being treated with a mixed acid and then heat-treated. It is understood that the mesocarbon microbeads have a hydrogen content of as much as about 4% but are unlikely to increase in volume, as already mentioned.

The separation fo carbonaceous mesophase from the heat-treated pitches is carried out by precipitation or- (and) solvent fractionation. More specifically, upon being allowed to stand in a molten state, the heat-treated pitches settle down and can be recovered.

When the heat-treated pitches are dissolved and dispersed in a solvent such as an organic solvent, e.g., quinoline or pyridine, or an aromatic oil containing much aromatic compounds, e.g., anthracene or creosote oil, they can be recovered as components insoluble matter in such solvents.

Acid Treatment

The carbonaceous materials are treated with nitric acid or a mixture of sulfuric and nitric acids.

Both sulfuric and nitric acids are preferably used in high concentrations; at least 95% for sulfuric acid and at least 60% for nitric acid. However, neither need be fuming sulfuric acid nor fuming nitric acid. More preferable results are obtained with the use of a mixture of nitric and sulfuric acids rather than nitric acid alone. When used, the mixed acids are preferably such that sulfuric and nitric acids are in a volume ratio ranging from 30:70 to 0:100. It is to be noted, however, that the optimum volume ratio ranges from 30:70 to 70:30. Hereinafter, the mixture of sulfuric and nitric acids will simply be referred to as the mixed acids or acid mixture.

The carbonaceous materials are added into nitric acid or the mixed acids, and are agitated, or allowed to stand, at a temperature ranging from 0 to 150° C. for 5 minutes to 5 hours. The reaction temperature and time are are determined by the degree of increase in the volume of the carbonaceous materials achieved in the next heat-treatment step. In general, the lower the temperature, the longer the time will be, while the higher the temperature, the shorter the time will be. After the treatment, the product is thoroughly washed with water and dried. It is to be noted, however, that the neutralization of the product with an alkaline metal salt for the removal of the acid is preferably avoided, since the alkali metal is then likely to remain.

Heat Treatment

The carbonaceous materials treated with the acid as described above are heat-treated at a temperature of 250° to 300° C.

This treatment causes the volume of the carbonaceous materials to increase several times to several tens of times. The rate of volume increase at this time is considered to be a factor in the acid treatment conditions. Of the heating conditions in said temperatur range, the heating rate, whether high or low, has little or no influence upon the rate of volume increase. This is because the decomposition of carbonaceous materials occurs in a narrow temperature range in the vicinity of approximately 250° C. Hence, this treatment is not necessarily carried out in the form of a separate step. This means that, unless any handling problem arises due to the increase in volume, the hat treatment may be followed immediately by graphitization.

Graphitization

The carbonaceous materials heat-treated or acid-treated as described above are heat-treated to a temperature of 2,400° C. or higher for graphitization. If the graphitization temperature is lower than 2,400° C., a graphite structure having the desired properties cannot be obtained, since both its compressibility and recovery decrease, although its weight is light. The higher the temperature, the more the flexiblity will be; however, a graphitization temperature of 3,000° C. or lower is preferable in view of economical considerations.

This treatment makes it possible to produce graphite structures which are of light weight and excellent elasticity.

The thus produced graphite structure is of light weight, as expressed in terms of its packing density of at most 0.5 g/cm$^3$. When put in a cylindrical vessel and receiving a load from above, this graphite structure is compressed. At this time, the compressibility is proportional to the load applied. Even when a very high compressibilit of as high as 90% is applied, a recovery of 50% or higher is obtained after the removal of the load. A load corresponding to a compressibility of 90% or higher is 500 kg/cm$^2$ of higher. Even when a load of 9,000 kig/cm$^2$ is applied, a recovery of 50% or higher is obtained. Thus, the graphite structures zccording to the present invention possess unique and excellent properties that the conventional carbonaceous materials do not.

Reference will now be made to the examples of the present invention. However, it is to be understood that the present invention is by no means limited to the description of such examples.

EXAMPLE 1

Two (2) kg of a FCC decanted oil, from which low-boiling components having a boiling point of not higher than about 500° C. had previously been removed by distillation under reduced pressure, was heat-treated under agitation to 500° C. in a nitrogen gas stream in a vessel of 5 liters, and were held at that temperature for 2 hours. Afterwards, the heating and stirring were stopped to cool off the vessel. When the internal temperature of the vessel reached 400° C., that temperature was maintained by heating. After the elapse of 3 hours from the beginning of cooling-off, about 1.6 kg of a pitch-like product was removed from the vessel through a hole set in the lower portion thereof. An about 2-fold amount of quinoline was added to this pitch-like product, and the mixture was heated at 90° C. for dissolution and dispersion. Then, the insoluble component was centrifuged and supplied with fresh qunioline and then heated and centrifuged. After this operation had been repeated five times, the insoluble coponent was amply washed with benzene and acetone and dried. The insoluble component thus obtained in an amount of 1.2 kg was found to show an anisotropic flow texture by the observation of its structure under a polarization microscope. Then, this insoluble component was used as the carbonaceous mesophase.

The elemental composition of the carbonaceous mesophase prepared in this manner was:
carbon 93.2%
Hydrogen 3.8%, and
Nitrogen 0.7%.

Five (5) g of the mesophase having a particle size of 1.17 to 0.70 mm was added in small portions to 100 ml of a mixed acid consisting of 97% concentrated sulfuric acid and 67% concentrated nitric acid in a volumetric ratio of 50:50 in a Erlenmeyer flask of 300 ml in volume. After the total amount of the mesophase had been added, the flask was heated for 60 minutes in an oil bath previously heated to 100° C. Then, the product was filtered out through a glass filter (No. 4), sufficiently washed with water, and was dried. The yield was 129.6% by weight. The product was placed in a cylindrical glass vessel of 500 ml, and then it was in turn held for 30 minutes in a salt bath previously heated to 300° C. The yield was 81.7% by weight with respect to the starting carbonaceous mesophase.

The packing density of this product was measured in the following manner. Ten (10) to fifteen (15) cc of a sample, as precisely weighed and calculated as volume, was placed in a graduated measuring cylinder of 20 ml, and its volume was measured after it had been confirmed that no volume change occurred upon being tapped well. The packing density was calculated from the volume and weight and was found to be 0.03 g/cm$^3$, a figure indicating that the volume increase was 28 fold, since the packing density of the carbonaceous mesophase as starting material was 0.83 g/cm$^3$.

Next, the product was heat-treated to 2,800° C. at a heating rate of 400° C./hr. in an argon gas stream and then held at that temperature for 30 minutes for graphitization. The yield was 38.2% by weight with respect to the carbonaceous mesphase, and the packing density 0.10 g/cm$^3$. The elastic recovery was determined in the following manner. In a cylindrical vessel of 10 mm inner diameter was put 0.5 g of the graphitized sample on which a load of 100 g/cm$^2$ was applied from above. The sample's volume at this time was used as the reference volume ($h_0$). A load of 500 g/cm$^2$ was then impressed on the sample to determine its volume ($h_1$). The load was subsequently removed from the sample to determine its volume ($h_2$). The compressibility and recovery were calculated by the following equations:

$$\text{Compressibility (\%)} = \{(h_0 - h_1)/h_0\} \times 100$$

$$\text{Recovery (\%)} = \{(h_2 - h_1)/(h_0 - h_1)\} \times 100$$

The compressibility calculated in this manner was 9.5%, and the recovery 100%. The compressibility and recovery of this sample determined under varied loads are shown in Table 2. The compressibility, which increases with increase in load, reaches 90% or higher at 500 kg/cm$^2$ or larger, with the recovery reaching as high as 75%, and is as high as 96% even at 9,300 kg/cm$^2$, with the recovery reaching as high as 58%.

Table 1 also shows the results obtained with the same starting carbonaceous mesophase which was treated with the mixed acids consisting of sulfuric and nitric acids in varied volume ratios and under varied mixed acid-treatment and graphitization conditions.

TABLE 1

| | Mixed Acid Treatment Conditions | | | | Graphitization Conditions | | Packing |
|---|---|---|---|---|---|---|---|
| Exp. Nos. | Volume Ratio Sulfuric:Nitric | Temperature (°C.) | Time (hr.) | Yield (wt. %) | Temperature (°C.) | Yield (wt. %) | Density (g/cm$^3$) |
| 1 | 50:50 | 100 | 1 | 129.6 | 2,800 | 38.2 | 0.10 |
| 2 | 50:50 | 50 | 1 | 138.9 | 2,800 | 65.1 | 0.18 |
| 3 | 50:50 | 50 | 5 | 143.3 | 2,800 | 69.9 | 0.11 |
| 4 | 50:50 | 0 | 1 | 141.0 | 2,800 | 78.9 | 0.20 |
| 5 | 50:50 | 150 | 0.17 | 129.6 | 2,800 | 67.4 | 0.06 |
| 6 | 50:50 | 100 | 1 | 129.6 | 2,600 | 55.3 | 0.09 |
| 7 | 50:50 | 100 | 1 | 129.6 | 2,400 | 56.3 | 0.09 |
| 8 | 50:50 | 100 | 1 | 129.6 | 2,000 | 56.9 | 0.09 |
| 9 | 90:10 | 100 | 1 | 118.8 | 2,800 | 67.3 | 0.76 |
| 10 | 30:70 | 100 | 1 | 135.6 | 2,800 | 61.2 | 0.07 |
| 11 | 70:30 | 100 | 1 | 138.1 | 2,800 | 65.6 | 0.12 |
| 12 | 0:100 | 100 | 1 | 126.0 | 2,800 | 60.8 | 0.32 |

Note:
The yields are calculated with respect to the starting carbonaceous mesophase.

The compressibility and recovery of these graphitized products were measured. The results are set froth in Table 2.

TABLE 2

| Exp. Nos. | Load (kg/cm$^2$) | Compressibility (%) | Recovery (%) |
|---|---|---|---|
| 1 | 0.5 | 9.5 | 100 |
| | 1.0 | 10.3 | 100 |
| | 2.0 | 12 | 83 |
| | 4.0 | 18 | 75 |
| | 5.0 | 22 | 75 |
| | 10 | 38 | 75 |
| | 500 | 88 | 75 |
| | 1,500 | 91 | 75 |
| | 5,500 | 96 | 67 |
| | 9,300 | 96 | 58 |
| 2 | 1.0 | 2.8 | 100 |
| | 2.0 | 8.3 | 100 |
| | 4.0 | 11 | 85 |
| | 5.0 | 23 | 83 |
| | 10 | 32 | 83 |
| | 500 | 85 | 82 |
| | 1,500 | 92 | 73 |
| | 5,500 | 92 | 77 |
| | 9,300 | 93 | 77 |
| 3 | 1.0 | 4.8 | 100 |
| | 2.0 | 9.5 | 100 |
| | 4.0 | 17 | 85 |
| | 5.0 | 19 | 85 |
| | 10 | 41 | 83 |
| | 500 | 87 | 77 |
| | 1,500 | 84 | 77 |
| | 5,500 | 92 | 72 |
| | 9,300 | 96 | 57 |
| 4 | 1.0 | 3.0 | 100 |
| | 2.0 | 9.1 | 100 |
| | 4.0 | 12 | 88 |
| | 5.0 | 22 | 88 |
| | 10 | 33 | 85 |
| | 500 | 85 | 80 |
| | 1,500 | 91 | 78 |
| | 5,500 | 91 | 75 |
| | 9,300 | 92 | 71 |
| 5 | 500 | 86 | 32 |
| | 1,500 | 86 | 32 |
| | 9,300 | 93 | 33 |
| 7 | 5 | 19 | 60 |
| | 10 | 38 | 52 |
| | 9,300 | 96 | 50 |
| 8 | 5 | 21 | 33 |
| | 10 | 34 | 25 |
| | 9,300 | 93 | 23 |
| 9 | 9,300 | 70 | 14 |
| 10 | 5 | 32 | 66 |
| | 10 | 58 | 63 |
| | 9,300 | 95 | 55 |
| 12 | 5 | 15 | 80 |
| | 10 | 36 | 80 |
| | 9,300 | 83 | 70 |

EXAMPLE 2

The elemental analysis of a carbonaceous mesophase obtained in a similar manner as in Example 1 was:
Carbon 92.9 %
Hydrogen 4.1 %, and
Nitrogen 0.5 %.

Five (5) g of the mesophase product, which had been classified to a particle size of 0.70 to 0.35 mm, were treated in the mxied acid in a similar manner as described in Example 1 and were then heat-treated at 300° C. for 3 minutes. The product was further heat-treated to 2,800° C. in a Tamman-furnace, wherein it was held for 30 minutes for graphitization. The compressibility and recovery of the obtained graphite structure were measured. The packing desntieis of graphitized structures obtained with the mixed acid in varied volume ratios under varied treatment conditions are shown in Table 3, and the compressibility and recovery thereof in Table 4.

TABLE 3

| Exp. Nos. | Mixed Acid Treatment Conditions | | | | Graphitization Conditions | | Packing Density (g/cm$^3$) |
|---|---|---|---|---|---|---|---|
| | Volume Ratio Sulfuric:Nitric | Temperature (°C.) | Time (hr.) | Yield (wt. %) | Temperature (°C.) | Yield (wt. %) | |
| 13 | 90:10 | 100 | 1 | 118.83 | 2,800 | 72.20 | 0.56 |
| 14 | 30:70 | 100 | 1 | 135.55 | 2,800 | 57.03 | 0.12 |
| 15 | 50:50 | 100 | 1 | 138.19 | 2,800 | 57.50 | 0.13 |
| 16 | 70:30 | 100 | 1 | 140.11 | 2,800 | 61.16 | 0.13 |
| 17 | 0:100 | 100 | 1 | 127.79 | 2,800 | 67.54 | 0.45 |
| 18 | 50:50 | 150 | 0.17 | 132.32 | 2,800 | 66.16 | 0.10 |
| 19 | 50:50 | 50 | 5 | 131.10 | 2,800 | 68.03 | 0.11 |

Note:
The yields are calculated with respect to the starting carbonaceous mesophase.

TABLE 4

| Exp. Nos. | Load (kg/cm$^2$) | Compressibility (%) | Recovery (%) |
|---|---|---|---|
| 13 | 5 | 30 | 44 |
| | 10 | 48 | 40 |
| | 9,300 | 95 | 33 |
| 14 | 9,300 | 95 | 61 |
| 15 | 5 | 27 | 85 |
| | 10 | 47 | 76 |
| | 9,300 | 93 | 57 |
| 16 | 9,300 | 92 | 61 |
| 17 | 9,300 | 94 | 56 |
| 18 | 9,300 | 95 | 44 |
| 19 | 9,300 | 92 | 64 |

EXAMPLE 3

Green coke obtained by the delayed coking process was pulverized to a particle size of 0.35 to 0.15 mm with the elemental analysis being carbon: 91.8%, hydrogen: 3.6%, and nitrogen: 1.4%. Five (5) g of the pulverized product was treated at 150° C. for 5 hours in the mixed acid consisting of 97% sulfuric acid and 67% nitric acid in a volume ratio of 50:50. After filtration, the product was amploy washed with water and dried. The yield was 120.8%. The product was then heat-treated for 30 minutes in a furnace previously heated to 300° C. The thus heat-treated product was graphitized at 2,800° C. for 30 minutes by a Tamman-furnace. The yield was 69.4%, and the packing density 0.48 g/cm$^3$. The compressibility and recovery of the thus graphitized structure were determined as in Example 1 and found to be respectively 21% and 67% under a load of 3 kg/cm$^2$ and respectively 43% and 57% under a load of 10 kg/cm$^2$.

COMPARATIVE EXAMPLE

The carbonaceous mesophase used in Example 1 was heat-treated at 800° C. for 30 minutes in a nitrogen gas stream. The elemental analysis of the obtaine dproduct was 94.1% of carbon, 1.8% of hydrogen, and 1.3% of nitrogen. This product was treated at 150° C. for 5 hours with mixed acids consisting of 97% sulfuric acid and 67% nitric acid in a volume ratio of 50:50. After filtration, ample water-washing was applied. The yield was 107.6%. The thus treated product was heat-treated for 30 minutes in a furnace previously heated to 300° C., and was then graphitized at 2,800° C. for 30 minutes by a Tamman-furnace. A graphitized structure was obtained in a 89.6% yield with a packing density of 0.78 g/cm$^3$. The compressibility and recovery of that structure were determined as in Example 1 and were found to be respectively 5.2% and 33% under a load of 2 kg/cm$^2$ and respectively 70% and 29% under a load of 9,300 kg/cm$^2$.

What is claimed is:

1. A graphite structure of light weight and excellent elasticity, which has a packign density of 0.5 g/cm$^3$ or lower and a recovery of 50% or higher at a compressibility of 10 to 90%.

2. A method for making a graphite structure which is of light weight and excellent elasticity and has a packing density of 0.5 g/cm$^3$ or lowe and a recovery of 50% or higher at a compressibility of 10 to 90%, which comprises the steps of:

treating a carbonaceous material with nitric acid or a mixture of nitric and sulfuric acids, said carbonaceous material being a member selected from the group consisting of carbonaceous mesophases, cokes, and mixtures thereof and which has a hydrogen content of 2% by weight or higher; and heat-treating the thus obtained product at a temperature of 2,400° C. or higher for graphitization.

3. A method as recited in claim 2, wherein said carbonaceous material is treated at a temperature of 0 to 150° C. for 5 minutes to 5 hours in a mixture of sulfuric acid and nitric acid in a mixing volume ratio of 70:30 to 0:100.

4. A graphite structure of light weight and excellent elasticity, which has a packing density of 0.5 g/cm$^3$ or lowe and a recovery of 50% or higher at a compressibility of 10 to 90%, said graphite structure produced by the method of claim 2.

* * * * *